(12) United States Patent
Vogelsang et al.

(10) Patent No.: US 10,087,022 B2
(45) Date of Patent: Oct. 2, 2018

(54) METHOD AND DEVICE FOR SYNCHRONIZED CHANNELING OF PIECE GOODS ON A SORTING CONVEYOR

(71) Applicant: BEUMER GmbH & Co. KG, Beckum (DE)

(72) Inventors: Markus Vogelsang, Ense-Bremen (DE); Thomas Feldmann, Beckum (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 15/490,373

(22) Filed: Apr. 18, 2017

(65) Prior Publication Data
US 2017/0297833 A1  Oct. 19, 2017

(30) Foreign Application Priority Data
Apr. 18, 2016 (EP) .................................. 16000871

(51) Int. Cl.
| | |
|---|---|
| B65G 47/31 | (2006.01) |
| B65G 65/00 | (2006.01) |
| B65G 15/28 | (2006.01) |
| B65G 15/64 | (2006.01) |
| G06F 3/00 | (2006.01) |

(52) U.S. Cl.
CPC ......... B65G 65/005 (2013.01); B65G 15/28 (2013.01); B65G 15/64 (2013.01); B65G 47/31 (2013.01); G06F 3/002 (2013.01)

(58) Field of Classification Search
CPC .................................................... B65G 47/31
USPC ............................ 198/572, 577, 370.04, 617
See application file for complete search history.

(56) References Cited

U.S. PATENT DOCUMENTS

| | | | | |
|---|---|---|---|---|
| 3,982,625 A | * | 9/1976 | Wentz | B65G 47/50 198/357 |
| 4,031,998 A | * | 6/1977 | Suzuki | B65G 47/962 198/370.04 |
| 4,339,025 A | * | 7/1982 | McCombie | A24C 5/35 198/347.3 |
| 4,807,739 A | * | 2/1989 | Wolf | B65G 47/2445 198/415 |
| 5,069,440 A | * | 12/1991 | Lazzarotti | B65G 47/2445 198/415 |

(Continued)

Primary Examiner — Joseph A Dillon, Jr.
(74) Attorney, Agent, or Firm — Ganz Pollard, LLC

(57) ABSTRACT

Method for synchronized channelling of piece goods onto a respective receptacle of a sorting conveyor, wherein the sorting conveyor has conveying units with in each case at least one receptacle for piece goods, which at a pre-determined conveying speed run past a synchronization conveyor system, and wherein the synchronization conveyor system has a synchronization conveyor and a channelling conveyor adjoining the synchronization conveyor, whereby, whenever a fault condition of a piece good on the synchronization conveyor system is recognized, the conveyor, synchronization or channelling conveyor, on which the piece good is located, is stopped and then the conveyor transporting the piece good is reversed, until the piece good is located in a pre-determined start position, and the synchronization conveyor and the channelling conveyor are moved forward, and sorting device to carry out the method.

10 Claims, 3 Drawing Sheets

(56) References Cited

U.S. PATENT DOCUMENTS

| | | | | |
|---|---|---|---|---|
| 5,170,877 A * | 12/1992 | Francioni | ............... | B65G 43/08 |
| | | | | 198/347.3 |
| 5,201,397 A * | 4/1993 | Isaacs | ....................... | B07C 1/04 |
| | | | | 198/395 |
| 5,267,638 A * | 12/1993 | Doane | ................... | B65G 43/08 |
| | | | | 198/357 |
| 5,285,887 A * | 2/1994 | Hall | ....................... | B65G 43/10 |
| | | | | 198/460.1 |
| 5,353,912 A * | 10/1994 | Killer | ..................... | B07C 3/082 |
| | | | | 198/370.04 |
| 5,924,546 A * | 7/1999 | Funaya | ................ | B65G 47/256 |
| | | | | 198/395 |
| 6,323,452 B1 * | 11/2001 | Bonnet | ................... | B07C 3/082 |
| | | | | 198/370.04 |
| 6,471,044 B1 * | 10/2002 | Isaacs | ................... | B65G 43/08 |
| | | | | 198/347.4 |
| 6,736,254 B1 * | 5/2004 | Fortenbery | .......... | B65G 47/962 |
| | | | | 198/370.03 |
| 6,843,362 B2 * | 1/2005 | Tachibana | .............. | B65G 43/10 |
| | | | | 198/460.1 |
| 7,090,067 B2 * | 8/2006 | Schiesser | ............... | B65G 15/22 |
| | | | | 198/395 |
| 2002/0063037 A1 * | 5/2002 | Bruun | .................... | B65G 37/02 |
| | | | | 198/370.01 |
| 2003/0150695 A1 * | 8/2003 | Cotter | .................... | B65G 15/22 |
| | | | | 198/460.1 |
| 2004/0104100 A1 * | 6/2004 | Schiesser | ............... | B65G 15/22 |
| | | | | 198/460.1 |
| 2015/0368049 A1 * | 12/2015 | Berghorn | .................. | B07C 5/00 |
| | | | | 198/370.04 |

* cited by examiner

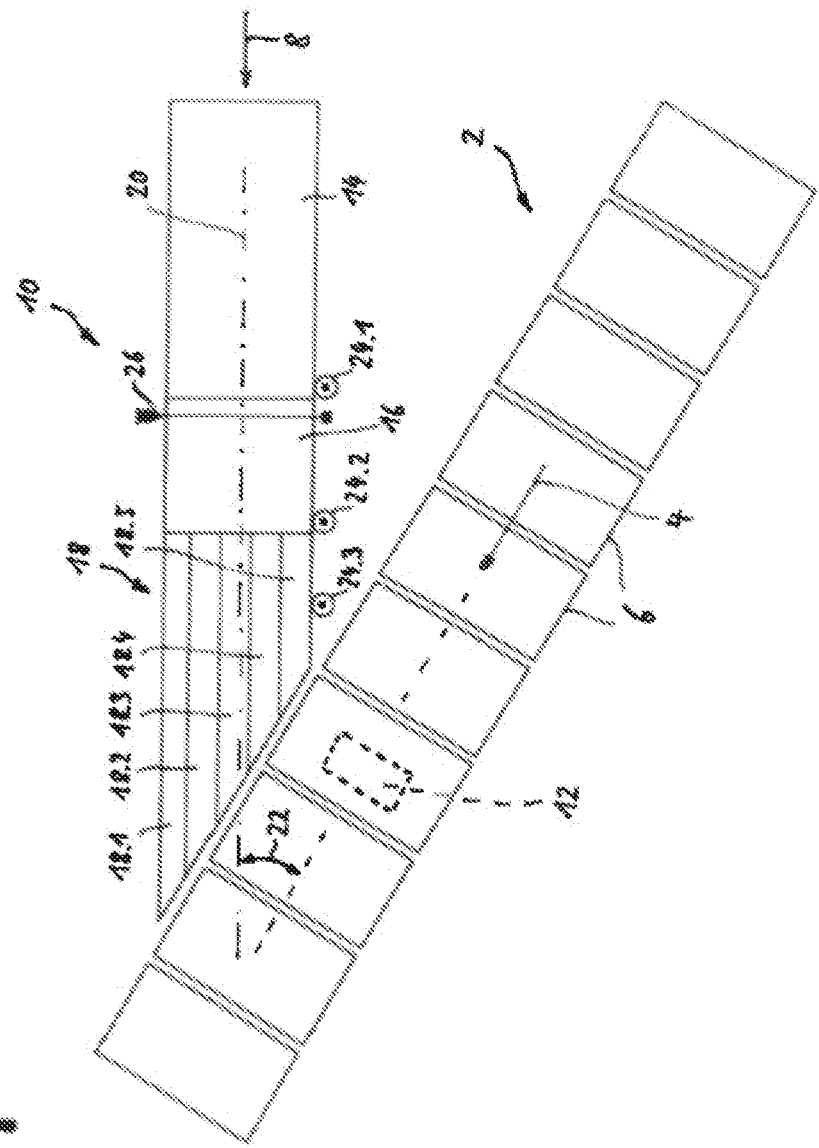

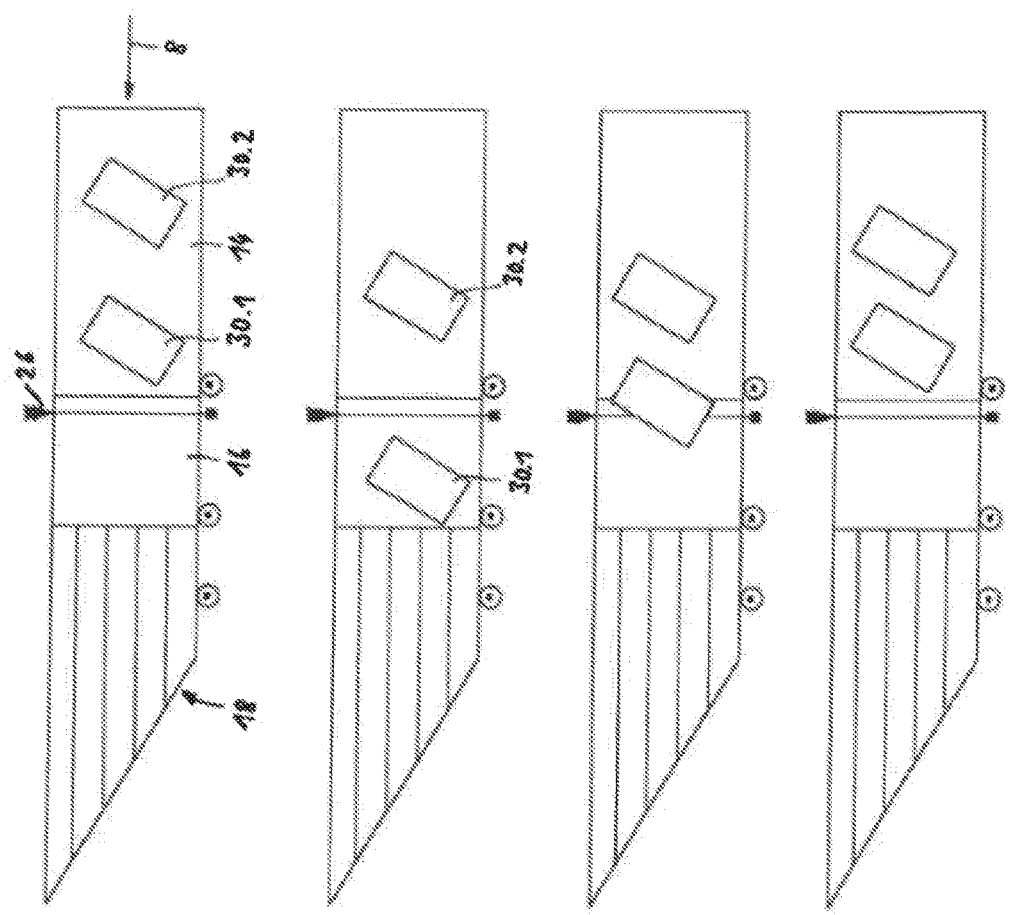

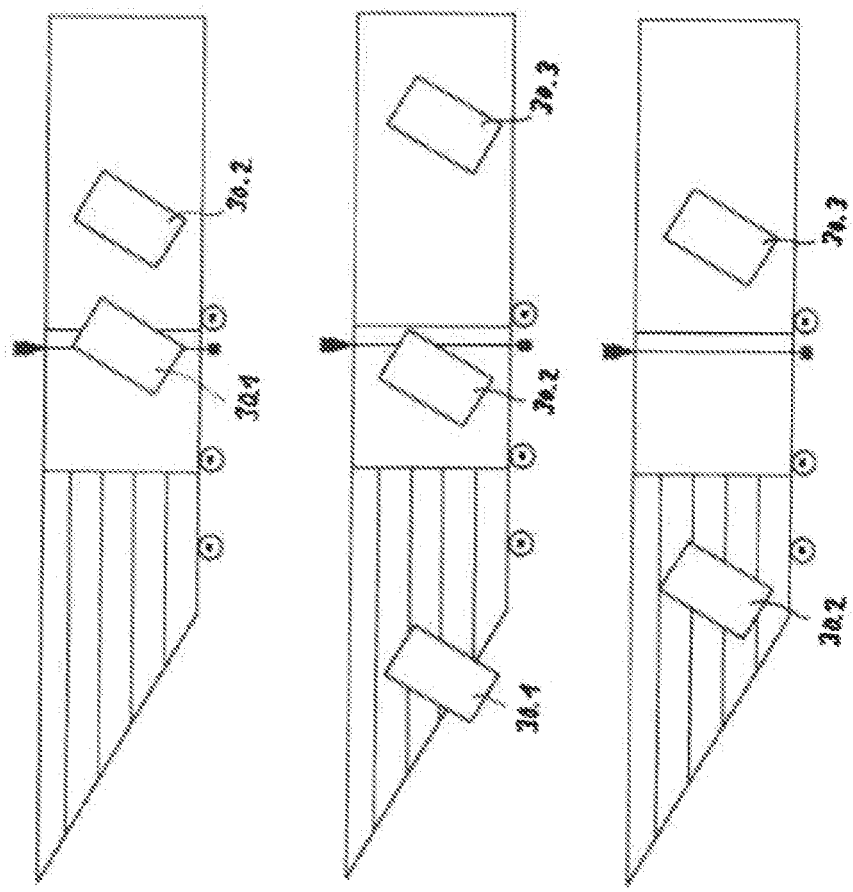

METHOD AND DEVICE FOR SYNCHRONIZED CHANNELING OF PIECE GOODS ON A SORTING CONVEYOR

BACKGROUND

The invention relates to a method for synchronized channelling of piece goods onto a respective receptacle of a sorting conveyor, the sorting conveyor comprising conveying units with in each case at least one receptacle for a piece good, which at a pre-determined conveying speed run past a synchronization conveyor system, and the synchronization conveyor system having two conveyors, i.e. a synchronization conveyor and a channelling conveyor adjoining the synchronization conveyor, and means for detecting a piece good to be channelled on the synchronization conveyor system, as well as a sorting device with a sorting conveyor and a synchronization conveyor system for carrying out the method.

With regard to mostly automated channelling of piece goods onto a sorting conveyor, which is provided with moved conveying units and load take-up means as for instance tilt-trays or cross-belts, occasionally in the case of piece goods, which can be shaped in the most varied of ways, a disturbance may occur, a piece good being for example unexpectedly re-detected by the sensing device or having a disadvantageous and/or incorrect position or orientation, from which it cannot be reliably channelled. In such cases either manual intervention is necessary or however the channelling movement of the piece good must be reversed, in order either to remove the piece good completely from the channelling operation or however to begin the channelling operation once again with the piece good in a correct position.

WO2015/052144 A1 discloses a system wherein an unstable piece good or one starting to roll undesirably is removed from the channelling operation by reverse movement of a feed conveyor.

DE 602 04 128 T2 discloses a method for synchronized channelling of piece goods, wherein an incorrect position of a piece good is recognized by light beams and in such a case the synchronization conveyor and channelling conveyor are stopped and reversed, until beyond a start detection cell, the reverse movement being maintained for a pre-determined period. Whenever a specific start position of the piece good is to be reached, such an approach presupposes that the reverse movement takes place at a very specific speed, so that the operation during a pre-determined period leads to a pre-determined route. This cannot always be ensured. In addition the known approach presupposes the arrangement and scanning of a light beam at a very specific position.

SUMMARY

The object of the invention consists of generally improving a generic method so that, in the event of the reverse movement of the piece good recognized for example as being in an incorrect position, work can proceed at speeds which can be arbitrarily pre-set without having to rely on light beams and time factors, as a result of which disturbances can be mostly avoided and the flexibility and effectiveness of the process can be increased. Thus manual interventions can be avoided or reduced and the throughput of the sorting conveyor can be enhanced.

Piece goods recognized as being in an incorrect position may be piece goods, the presence of which is already known, but their position or orientation has suddenly changed, or piece goods, which are suddenly recognized by the sensing device unexpectedly on the channeling conveyor, or however also piece goods, which are to be channelled assuredly after an emergency stop.

According to the invention in the case of a generic method it is proposed that if a fault condition as for instance an incorrect position or orientation of a piece good on the synchronization conveyor system is recognized, that conveyor, i.e. the synchronization conveyor or the channelling conveyor, on which the piece good is located, is stopped and then reversed, for a specific distance, which is controlled by means of a tracker, for instance is controlled by pulses from incremental encoders of the synchronization conveyor system, until the piece good recognized as being defective, for instance in an incorrect position, is located in a pre-determined start position, and the synchronization conveyor and the channelling conveyor are moved forward, in order to channel the piece good onto a specific receptacle of the sorting conveyor. The incremental encoders cited above and below are given by way of example. With respect to the tracking the use of various sensing devices (light beams, light scanners, cameras, ultrasonic sensors, scales) is also possible.

The reverse movement of the conveyor transporting the piece good recognized as being defective is controlled by a tracker, whereby the movement of the conveyor and/or the movement of the piece good can be tracked directly. Whenever the movement of the conveyor is tracked, this can be effected in particular by incremental encoders. Whenever the route of the piece good is tracked, this can be effected for example by optical recognition using a light beam or camera with image processing, or laser scanners or laser-based scanners. Both approaches can be combined, whereby the movement of the conveyor and that of the piece good can be tracked independently from one another.

Preferably the reverse movement is controlled time-independently over a specific distance, i.e. exclusively by means of tracking the distance travelled by the conveyor and/or the piece good.

Furthermore it is proposed that the pre-determined start position is individually pre-determined for each individual case of fault arising. Alternatively a permanently pre-determined start position could be applied for each case of fault.

According to the invention the distance travelled by the synchronization conveyor system is recorded and controlled during the reverse movement for example using incremental encoder pulses of the synchronization conveyor system, so that the piece good recognized as being in a fault condition, for example recognized as being in an incorrect position, without any light beams having to be interrogated, and without the synchronization conveyor system having to be operated at a pre-set speed and for a pre-set period, can be transported into a start position specially newly pre-determined for each explicit case of fault.

Additionally to the aforesaid distance-based controller it may be proposed that a speed, location, orientation or position (lying too far outside the centre line of the synchronization conveyor system) of a piece good on the synchronization conveyor system is detected by one or more light beams, which can be arranged in the region of the channelling conveyor and/or in the region of the synchronization conveyor and/or in the region of the feed conveyor. It is possible that a fault condition such as an incorrect position of a piece good on the synchronization conveyor system is detected by one or more light beams.

It may be proposed that the specific distance is controlled by means of distance-based pulses from an incremental encoder of the synchronization conveyor. Alternatively or additionally it may be proposed that the specific distance is controlled using distance-based pulses from an incremental encoder of the channelling conveyor.

The invention also relates to a sorting device with a synchronization conveyor system and a sorting conveyor with conveying units moved along a conveying track, which in each case have at least one receptacle for a piece good and at a pre-determined conveying speed run past the synchronization conveyor system, the synchronization conveyor system having a synchronization conveyor, a channelling conveyor adjoining the synchronization conveyor and means for detecting a piece good to be channelled, in particular from its position, on the synchronization conveyor system, and with a controller connected to the synchronization conveyor system, which is designed to pick up distance-based signals or information of the tracking system associated with the synchronization conveyor system and to carry out the method according to any one of the preceding claims.

The tracking system can be designed to record the distance travelled by the conveyor transporting the defective piece good and possibly the feed conveyor, and/or directly to record the distance travelled by the piece good. The tracking system works most expediently time-independently.

It may be proposed that the synchronization conveyor system has at least one light beam connected to the controller, with which a location, speed and/or correct or incorrect orientation and/or position of a piece good on the synchronization conveyor system can be detected.

The controller can be designed to pick up distance-based pulses from an incremental encoder of the synchronization conveyor. Alternatively or additionally the controller can be designed to pick up distance-based pulses from an incremental encoder of the channelling conveyor.

The synchronization conveyor system can have a feed conveyor located before the synchronization conveyor. The feed conveyor can comprise several individual conveyors arranged in series, which can be controlled independently from one another. Several individual conveyors can be operated for example at different speeds, as the result of which the spacing on either side of adjacent piece goods can be increased or reduced.

It may be proposed that at least one light beam connected to the controller is arranged in the region of the feed conveyor to detect a piece good, in particular its location, position or speed. The invention is described below on the basis of an exemplary embodiment, reference being made to a drawing, wherein

BRIEF DESCRIPTION OF THE DRAWINGS

FIG. 1 shows a schematic plan view onto a sorting device according to the invention with a sorting conveyor and a synchronization conveyor system, FIGS. 2*a*-2*g* show the detection of an incorrect piece good and its reversal up to a start position.

DETAILED DESCRIPTION

FIG. 1 in a schematic plan view shows a sorting conveyor 2 with conveying units 6 which can move along a conveying track extending in a conveying direction 4, wherein it can concern trollies with tilt-trays held thereon, cross-belt conveyors or similar load take-up means, each conveying unit 6 having at least one receptacle for a piece good and at a pre-determined conveying speed moving in conveying direction 4. Directly adjacent to the sorting conveyor 2 is a synchronization conveyor system 10, which serves to apply a movement component in conveying direction 4 to the piece goods being loaded onto the sorting conveyor 2 in a channelling direction 8 and as gently as possible, i.e. as relatively slowly as possible, to channel these onto a free receptacle 12 of a conveying unit 6.

The synchronization conveyor system 10 in the illustrated example consists of a feed conveyor 14, a synchronization conveyor 16 adjoining this and a channelling conveyor 18 arranged directly adjacent to the sorting conveyor 2. Feed conveyor 14, synchronization conveyor 16 and channelling conveyor 18 are located in a common longitudinal direction 20, which is arranged at an acute angle 22 to the conveying direction 4 of the sorting conveyor 2. This angle does not necessarily have to be acute. The channelling conveyor 18 can consist of a series of individual conveyors or belt conveyors 18.1, 18.2 . . . 18.5 arranged in parallel next to each other, which have a different length, so that the channelling conveyor 18 adjoins the conveying units 6 with as small a gap as possible. The channelling conveyor 18 therefore has a roughly trapezoidal outline overall. If necessary it may be proposed that the individual conveyors forming the channelling conveyor 18 can be driven at different speeds, in order if necessary to turn a piece good located thereon about an axis arranged vertically to the conveying plane of the channelling conveyor 18 and to transfer this to the sorting conveyor 2 in an optimal alignment.

In the illustrated exemplary embodiment all conveyors of the synchronization conveyor system 10 are designed as belt conveyors and apart from a motor governed by a controller in each case have an incremental encoder, that transmits distance-based pulses to the controller. The feed conveyor 14 has an incremental encoder 24.1, the synchronization conveyor 16 has an incremental encoder 24.2 and the channelling conveyor 18 has an incremental encoder 24.3, which in each case generate distance-based pulses, for example one pulse per 1 mm or 1 cm distance or transport route of the respective conveyor. Whenever the channelling conveyor consists of several individual conveyors as cited above, a sum pulse encoder or corresponding single pulse encoders may be proposed. On the basis of these pulses transmitted to the controller, the conveying movement of each individual conveyor of the synchronization conveyor system 10 can be exactly replicated, and consequently also a distance, over which a piece good is moved. The incremental encoders can either be directly coupled to a drive motor of the respective conveyor or can be formed by the motor itself, for example in case of a stepping motor, or it can be an independent encoder coupled to the conveyor belt or a guide roller of the respective conveyor.

In the illustrated exemplary embodiment a light beam 26 is arranged in the region of the synchronization conveyor 16 to detect the position of a piece good to be fed, the scanning plane of which runs transversely to the longitudinal axis 20 of the synchronization conveyor 16.

FIGS. 2*a* to *d* describe the recognition of an incorrect position of a piece good to be fed and its subsequent reverse movement up to a pre-determined start position.

FIG. 2*a* shows a channelling operation with a first piece good 30.1 and a following second piece good 30.2, which are transported in the channelling direction 8 on the feed conveyor 14 towards the synchronization conveyor 16. The first piece good 30.1 is located directly before a front end of the feed conveyor 14, within the region of a transition between feed conveyor 14 and synchronization conveyor 16, and also directly before the light beam 26, which is situated at a rear end of the synchronization conveyor 16 in relation to the channelling direction 8.

FIG. 2b shows the channelling operation with a time interval according to the situation in FIG. 2a, wherein the first piece good 30.1 has completely moved through the light beam 26 and is located on the synchronization conveyor 16. The synchronization conveyor 16 in the illustrated example is operated at a greater speed than the feed conveyor 14, so that the distance between two piece goods, one of which is already located on the feed conveyor 14 and another on the synchronization conveyor 16, increases, as comparison between FIG. 2b and FIG. 2a shows. Alternatively the synchronization conveyor can be operated at the same speed as the feed conveyor.

Whenever an evaluation of one or more parameters shows that the first piece good 30.1 present on the synchronization conveyor 16 or the channelling conveyor cannot be channelled without problem, which can be due for example to an incorrect position, that relates to the longitudinal axis (centre line) 20 or orientation (alignment relative to the channelling direction 8) of the first piece good 30.1, its insufficient speed or a wrong timing in relation to a free receptacle on the sorting conveyor, the synchronization conveyor and the channelling conveyor are stopped and then reversed against the channelling direction 8, until the first piece good 30.1 is located in a pre-determined start position for this case of fault. The pre-determined start position can be a position on the feed conveyor 14 or on the synchronization conveyor 16.

FIG. 2c shows the channelling operation after the aforesaid reverse movement of the synchronization conveyor 16 has been executed, the first piece good 30.1 being located in the region of the transition between synchronization conveyor 16 and feed conveyor 14 and also in the region of the light beam 26. In the illustrated example the feed conveyor 14 was stopped during the reverse movement of the synchronization conveyor 16, so that the distance between the first piece good 30.1 and the second piece good 30.2, still present on the feed conveyor 14, has reduced. As soon as the first piece good 30.1 enters the region of the feed conveyor 14, i.e. starting from the condition illustrated in FIG. 2c, the feed conveyor 14 is reversed (moved against the channelling direction 8), so that not only the first piece good 30.1 recognized as being not to be channeled without problem, but also the second piece good 30.2 and, if present, all further piece goods present on the feed conveyor 14 are reversed. The duration of this reverse movement lasts until the first piece good 30.1 is located in a pre-determined start position, from which problem-free renewed channelling is possible.

The reverse movement of the different conveyors (channelling conveyor, synchronization conveyor and feed conveyor), which are involved in reversing the piece good 30.1 to be re-channelled up to the pre-determined start position, is not controlled time-independently by light beams, but exclusively by distance-based pulses from the incremental encoders 24.1, 24.2, 24.3 used in this example. So far as light beams are provided, such as in particular the light beam 26, these serve to detect parameters such as location, orientation, speed and position of piece goods during the forward movement as part of the channelling process.

The new channelling operation, which for the piece good 30.1 is illustrated in FIGS. 2e and 2f, is carried out following the reverse movement of the piece good 30.1 being re-channelled to a pre-determined start position in accordance with FIG. 2d. After the new transfer of the first piece good 30.1 from the feed conveyor 14 onto the synchronization conveyor 16 (FIG. 2e) and detection by the light beam 26, the piece good 30.1 arrives at the channelling conveyor 18 (FIG. 20 and from there onto a specific receptacle 12 of the sorting conveyor 2.

FIG. 2g shows the channelling operation of the second piece good 30.2, this already being located on the channelling conveyor 18, and just as FIG. 2f, shows a further piece good 30.3, which is still located on the feed conveyor 14.

The invention claimed is:

1. A method for synchronized channeling of piece goods onto a respective receptacle of a sorting conveyor, wherein the sorting conveyor has conveying units with in each case at least one receptacle for piece goods which at a pre-determined conveying speed runs past a synchronization conveyor system and wherein the synchronization conveyor system has a synchronization conveyor, a channeling conveyor adjoining the synchronization conveyor, and means for detecting a piece good to be channeled on the synchronization conveyor system, the method comprising: recognizing a piece good on the synchronization conveyor systems as being in a fault condition; stopping the conveyor, synchronization or channeling conveyor, on which the piece good is located; and then reversing the conveyor transporting the piece good for a specific distance, thereby reversing the piece good from the fault condition by the specific distance, which distance is controlled by means of a tracker, recognizing the reversed piece good in a pre-determined start position; and moving the synchronization conveyor and the channeling conveyor to channel the piece good onto a specific receptacle of the sorting conveyor, the specific receptacle being different from a receptacle the piece good would have been delivered to had the fault condition not be recognized and corrected.

2. The method according to claim 1, wherein a location, orientation or position of the piece good on the synchronization conveyor is detected by one or more sensing devices.

3. The method according to claim 1, wherein a fault condition selected from the group of an incorrect position, orientation or speed of the piece good is detected by one or more sensing devices.

4. The method according to claim 1, wherein the specific distance is controlled by means of distance-based pulses from an incremental encoder of the synchronization conveyor and/or by means of distance-based pulses from an incremental encoder of the channeling conveyor and/or by means of distance-based pulses from an incremental encoder of a feed conveyor upstream to the synchronization conveyor.

5. The method according to claim 1, wherein the specific distance is controlled by direct tracking of the piece good recognized as being defective in position.

6. The method according to claim 5, characterized in that tracking takes place by means of a sensing device selected from the group of a light beam emitter, a light sensor, a camera with image processing, an ultrasonic sensor, and a weight sensor.

7. A sorting device, comprising a synchronization conveyor system and a sorting conveyor with conveying units moved along a conveying track, which in each case have at least one receptacle for piece goods and at a pre-determined conveying speed run past the synchronization conveyor system, wherein the synchronization conveyor system has a synchronization conveyor, a channeling conveyor adjoining the synchronization conveyor, and means for detecting a piece good to be channeled on the synchronization conveyor system, and with a controller connected to the synchronization conveyor system, which is designed to pick up distance-based information of a tracking system associated with the synchronization conveyor system; and wherein the controller is configured to recognize a piece good on the synchronization conveyor systems as being in a fault condition; to stop the conveyor, synchronization or channeling conveyor, on which the recognized piece good is located; and then to reverse the conveyor transporting the recognized piece good for a specific distance, thereby reversing the piece good from the fault condition by the specific distance, which distance is controlled by means of a tracker configured to recognize the reversed, recognized piece good in a pre-determined start position; and to move the synchronization conveyor and the channeling conveyor to channel the reversed, recognized piece good onto a specific receptacle of the sorting conveyor, the specific receptacle being different from a receptacle the piece good would have been delivered to had the fault condition not be recognized and corrected.

8. The sorting device according to claim 7, wherein the synchronization conveyor system has at least one sensing device connected to the controller, with which a piece good, in particular its location, position, orientation or speed, can be detected on the synchronization conveyor system.

9. The sorting device according to claim 7, wherein the controller is designed to pick up distance-based pulses from an incremental encoder of the synchronization conveyor and/or to pick up distance-based pulses from an incremental encoder of the channeling conveyor and/or to pick up distance-based pulses from an incremental encoder of a feed conveyor upstream to the synchronization conveyor.

10. The sorting device according to claim 7, wherein a sensing devices selected from the group of a light beam emitter, a light scanner, a cameras with image processing, an ultrasonic sensor, and a weight sensor are associated with the synchronization conveyor system and/or the feed conveyor for generating distance-based signals or information of a piece good, wherein the controller is designed to pick up distance-based signals or information of the sensing devices or to generate distance-based information from the signals of the sensing devices.

* * * * *